United States Patent
Agrawal et al.

(10) Patent No.: US 6,330,291 B1
(45) Date of Patent: Dec. 11, 2001

(54) FREQUENCY TRACKING FOR COMMUNICATION SIGNALS USING M-ARY ORTHOGONAL WALSH MODULATION

(75) Inventors: Avneesh Agrawal; Rajiv Vijayan, both of San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 08/625,481

(22) Filed: Mar. 29, 1996

(51) Int. Cl.[7] .......................... H04L 27/233; H04L 27/06
(52) U.S. Cl. ............................................ 375/326; 375/343
(58) Field of Search ................................. 375/200, 208, 375/326, 344, 327, 142, 147, 149, 150, 343; 370/208, 209; 329/306–308

(56) References Cited

U.S. PATENT DOCUMENTS

| | | | |
|---|---|---|---|
| 4,494,238 | * 1/1985 | Groth, Jr. ............................ | 375/200 |
| 4,841,544 | 6/1989 | Nuytkens ................................ | 375/1 |
| 5,357,454 | 10/1994 | Dent ...................................... | 364/727 |
| 5,608,722 | * 3/1997 | Miller .................................... | 370/320 |
| 5,619,524 | * 4/1997 | Ling et al. ............................ | 375/200 |
| 5,623,487 | * 4/1997 | Natali .................................... | 375/200 |
| 5,687,166 | * 11/1997 | Natali et al. .......................... | 370/209 |
| 5,764,630 | * 6/1998 | Natali et al. .......................... | 375/208 |

OTHER PUBLICATIONS

Tadahiro Wada et al., "Non–coherent Reception of M–ary Spread–Spectrum Signals in the Presence of Carrier Frequency Offset", *IEICE Trans. Fundamentals*. vol. E78–A. No. 9, Sep. 1995, pp. 1102–1106.

* cited by examiner

*Primary Examiner*—Tesfaldet Bocure
(74) *Attorney, Agent, or Firm*—Philip R. Wadsworth; Gregory D. Ogrod (57) ABSTRACT

A frequency tracking loop for a communication system using orthogonal Walsh modulation is provided. The frequency tracking loop includes a correlator (120), such as a fast Hadamard transformation device, and a discriminator (130). The correlator (120) produces a correlation vector (122) representing the result of correlating the input signal with each of a set of Walsh functions, with corresponding index values. The discriminator (130) produces a frequency error signal (ê) based on the correlator (120) output with the highest energy level and other correlator outputs whose indices are related to the index of highest energy correlator output by powers of two. The frequency error signal (ê) is generated by producing a cross product between the highest energy output and one or more of the other related correlator outputs. In further aspects, a filter (140) can be used to further shape the resulting error signal (ê) and form a frequency offset estimate signal (f̂).

34 Claims, 2 Drawing Sheets

FREQUENCY TRACKING FOR COMMUNICATION SIGNALS USING M-ARY ORTHOGONAL WALSH MODULATION

BACKGROUND OF THE INVENTION

I. Field of the Invention

The present invention relates generally to frequency tracking loops used in communication systems, and more particularly to a frequency tracking loop for use in a communication system employing orthogonal Walsh modulation.

II. Description of the Related Art

In every communication system employing modulated communication signals, some mechanism must be provided to demodulate received signals. Further, in order to ensure accurate demodulation, the demodulator must be able to compensate for variations or shifts in the carrier frequency of the received signals.

One conventional technique used to implement such carrier shift tracking in a communication system demodulator is to use a Phase Locked Loop ("PLL"). This type of demodulator works well when the transmitted signal is modulated using conventional modulation techniques, and can be reasonably optimized for either a wide frequency range response or high accuracy. Where more sophisticated modulation schemes are used, however, certain properties of these modulation schemes can make traditional techniques much less useful or responsive.

This is particularly true in digital spread spectrum type communication systems employing M-ary orthogonal Walsh code modulation. As part of such techniques, groups of data symbols to be transferred are mapped into Walsh functions or codes that are transmitted. The received signal is demodulated with respect to a set of such Walsh codes to establish a likelihood as to which codes were transmitted to establish what data symbols are being transferred. However, frequency errors in tracking such signals, especially in the presence of noise, greatly reduces the ability to distinguish which Walsh code was received, and it can quickly become problematic for conventional tracking techniques to maintain frequency tracking.

Therefore, what is needed is a frequency tracking loop designed to take advantage of certain properties associated with M-ary orthogonal Walsh modulation to provide improved tracking abilities. Such an apparatus and tracking method would be useful in implementing more effective communication signal demodulators.

SUMMARY OF THE INVENTION

The present invention comprises apparatus and method for tracking the carrier frequency used in a communication system employing M-ary orthogonal modulation. The invention may be implemented alone, or as part of a larger demodulation system. A preferred embodiment of the invention operates in an environment or system, such as a wireless spread spectrum communication system, where M-ary orthogonal Walsh modulation is employed. In this embodiment, the invention includes a frequency tracking loop comprising a rotator or rotation means, a correlator or correlation means, a discriminator or discrimination means, and a filter or filtering means.

The rotation means receives an input signal and a frequency offset estimate and produces a frequency shifted input signal, the frequency shift being proportional to the frequency offset estimate. The correlation means determines the correlation between a set of Walsh functions and the frequency shifted input signal, and produces a correlation vector. The correlator output may also be used as a data output as well. The discrimination means receives the correlation vector and produces a frequency error signal ("current error"). The filtering means accumulates the resulting frequency error signals to produce the frequency offset estimate used by the rotator means ("residual error").

The correlation vector produced by the correlator or correlation means includes a plurality of correlation results, each correlation result being the result of a correlation between the frequency shifted input signal and a single Walsh function. Each correlation result has an index value, which may be represented in binary notation, with each index value corresponding to a particular Walsh function.

In one embodiment, the discrimination means determines the current error of the frequency tracking loop as follows. First, the Walsh index of the correlation result with the highest signal energy contained in the correlation vector is determined. This value is selected as representing the most likely transmitted Walsh function or code, and as containing the largest amount of the transmitted signal component. One of the bits of the binary representation of the Walsh index associated with this correlation result is then inverted to generate a Walsh index of another Walsh function. The correlation result from the correlation means having this second index is selected, and a cross product is formed between this second result and the first selected result. That is, the imaginary part of a product between the correlation result with the highest energy level and the complex conjugate of a second correlation result corresponding to a bit reversed index for the first result, is then determined. The resulting cross product value that is determined from this process is proportional to the current error of the frequency tracking loop.

Generally, the most significant bit (MSB) of the binary representation of the Walsh index associated with the highest energy output from the correlator is the bit that is reversed. The correlation means output for the Walsh index selected by reversing the first MSB is predicted to contain the second largest signal component when there is a frequency tracking error.

In other embodiments, the discriminator determines the current error of the frequency tracking loop by substituting correlation results corresponding to other inverted Walsh index bits into the cross product calculation. The correlation means output corresponding to reversing the second MSB is predicted to provide the third largest transmitted signal component, the correlation means output for reversing the third MSB is predicted to provide the fourth largest signal component, and so forth. Therefore, each particular index bit is selected for reversal based on a desired or predicted amount of signal energy, and its relative output offset, to use for determining the current error of the frequency tracking loop. Selecting higher order significant bits generally provides better steady state loop performance while lower order bits provide a higher pull-in range.

In still other embodiments, the discriminator determines the current error by averaging various combinations of correlation results, each determined through bit manipulation or reversal, as described above. Where even greater accuracy is required, the average of two or more results obtained from differing types of processing (cross products), as described above, can be produced.

Further features and advantages of the present invention as well as the structure and operation of various embodiments of the present invention are described in detail below with reference to the accompanying drawings.

BRIEF DESCRIPTION OF THE DRAWINGS

The invention is best understood by reference to the drawings wherein like reference numbers indicate identical or functionally similar elements. In addition, digits to the left of the two right-most digits of the reference numbers refer to the figure number in which the reference number first appears in the accompanying drawings, wherein.

DETAILED DESCRIPTION OF THE PREFERRED EMBODIMENTS

I. Introduction

The present invention comprises a system and method for implementing a frequency tracking loop in a communication system employing M-ary orthogonal Walsh modulation of communication signals. A preferred embodiment of the invention is discussed below, together with a number of alternative embodiments. Where specific steps, configurations and arrangements are discussed, it should be understood that this is done for illustrative purposes only. A person skilled in the relevant art will recognize that other steps, configurations and arrangements can be used without departing from the teachings and scope of the invention.

The frequency tracking loop of the present invention operates to accomplish much the same function as conventional frequency tracking loops. Furthermore, as with conventional frequency tracking loops, the frequency tracking loop of the present invention may be implemented alone, or as an integral part of a system demodulator. In either case, the frequency tracking loop tracks the center of the carrier frequency of a modulated communication signal to enable accurate demodulation. Thus, as the center of the carrier frequency drifts, the frequency tracking loop automatically shifts the received signal to permit accurate demodulation. In addition, if the frequency of local oscillators used to track the carrier frequency changes, which can appear as a carrier shift, the frequency tracking loop also shifts the received carrier. The response of the frequency tracking loop therefore ultimately determines the overall effectiveness and accuracy of the demodulator.

As stated above, the frequency tracking loop of the present invention operates in a communication system employing M-ary orthogonal Walsh modulation. In such a system, data to be transmitted is mapped into digital values, with each digital value corresponding to the index of one Walsh function. The Walsh function represented by this index value can then be transmitted (e.g., as a series of "chips"). Upon receipt, providing that the time alignment is known, each series of chips can be correlated with the predefined universe of Walsh functions to determine which Walsh function was received. The results of this correlation process are used to determine the "most likely" Walsh function being transmitted during any given. Once this Walsh function has been determined, the digital value of the index corresponding to that Walsh function represents the data that was most likely transmitted.

A more detailed explanation of this follows. First, however, because the present invention operates primarily where Walsh code modulation is employed, a brief overview of Walsh codes is in order.

II. Walsh Code Generation

As stated above, one type of signal modulation is Walsh code modulation, which is utilized by the preferred embodiment of the present invention. The derivation of Walsh codes is more fully disclosed in U.S. Pat. No. 5,103,459 (the '459 patent) entitled "*System And Method For Generating Signal Waveforms In A CDMA Cellular Telephone System*". The '459 patent is assigned to the assignee of the present invention, the disclosure of which is incorporated herein by reference. A short description of Walsh codes is, nonetheless, provided below.

It is well known in the art that for any power of 2, a set of n orthogonal binary sequences, each of length n, can be constructed. In fact, orthogonal binary sequence sets are known for most lengths which are multiples of four and less than two hundred.

One class of such orthogonal binary sequences that are useful for orthogonal codes, and are also relatively easy to generate, are called Walsh functions. Walsh functions are derived from Walsh function matrices, also known as Hadamard matrices. A Hadamard matrix of order n over the real field can be defined recursively as:

$$H_n = \begin{bmatrix} H_{n/2} & H_{n/2} \\ H_{n/2} & \overline{H}_{n/2} \end{bmatrix}$$

where $\overline{H}$ denotes the additive inverse of H, and $H_1=1$ (i.e. $\overline{H}_1=-1$).

Therefore, the first two Hadamard matrices of orders 2 and 4 can be represented as:

$$H_2 = \begin{bmatrix} 1 & 1 \\ 1 & -1 \end{bmatrix} \text{ and }$$

$$H_4 = \begin{bmatrix} H_2 & H_2 \\ H_2 & \overline{H}_2 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

A Walsh function, then, is simply one of the rows of a Walsh matrix (Hadamard matrix), and a Walsh function matrix of order 'L' is a square matrix containing L functions or sequences, each being L chips (bits) in length.

A Walsh function of order n (as well as other orthogonal functions) has the property that over an interval of L chips (e.g., an L-length code symbol) in a string of chips, the correlation between all of the different functions within a set of L-length functions is zero, provided there is temporal alignment. This is independent of data modulation (±1) or function. This is easily understood by observing that exactly half of the chips or bits in every function differ from those in all other functions.

For M-ary modulation, the Walsh function size or code sequence length L is set equal to the desired number of orthogonal code sequences to be accommodated by the communication system. An exemplary Walsh function size useful for implementing advanced communication systems is sixty-four (L=64) for subscriber-to-gateway or base-station links. This creates up to sixty-four different values or states that are detectable for data being transferred from a given subscriber. The Walsh functions are typically configured as a pre-defined set or table of binary sequences comprising 64 Walsh functions, each having a 64 chip length, such as listed in the IS-95 system specification referenced below.

The above-described properties of Walsh codes make them ideal for use in transmitting data in CDMA communications systems. Furthermore, as will be described below, the inventors have discovered that the unique properties of Walsh codes also permit them to be used to increase the effectiveness of a frequency tracking loop.

III. Preferred Embodiments Of The Present Invention

Figure 1:
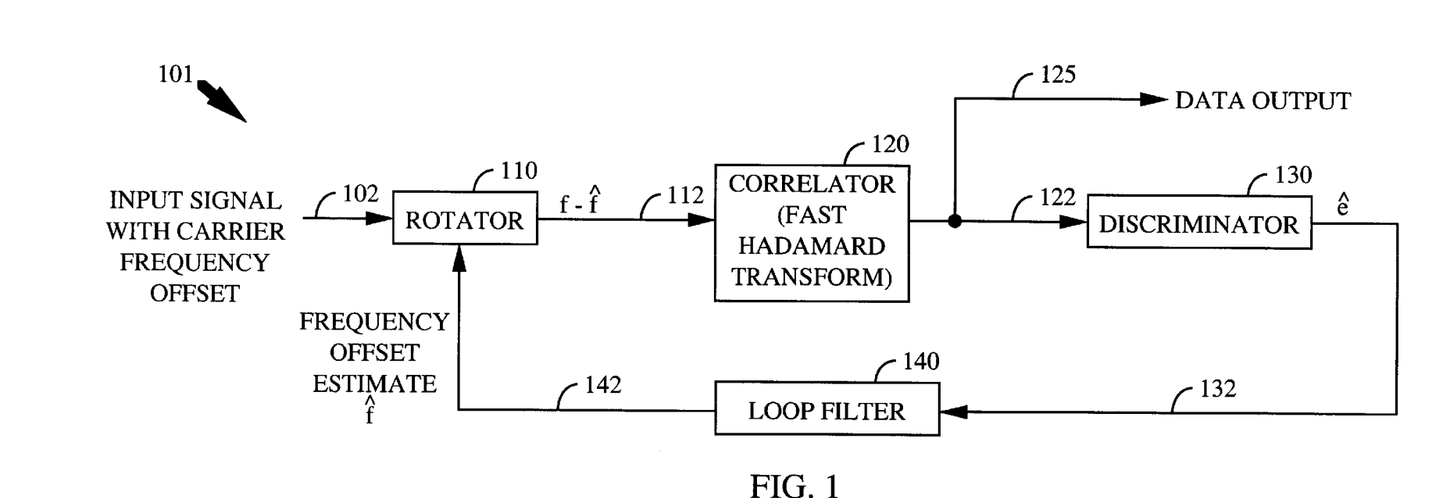
FIG. 1 depicts a block diagram of the frequency tracking loop of the present invention.

Referring to FIG. 1, a preferred embodiment of the present invention is described. FIG. 1 depicts a block diagram of a frequency tracking loop 101 constructed and operating according to the present invention. Frequency tracking loop 101 employs a rotation element or rotator 110, a correlation element or correlator 120, a discriminator 130, and a loop filter 140. An exemplary correlator is a Fast Hadamard Transformation (FHT) device. However, other correlators known in the art can be employed within the teachings of the invention, as long as they provide structured Walsh function index outputs or ordering.

As stated above, frequency tracking loop 101 tracks the center frequency of the carrier used to transmit data in any communication system where M-ary Walsh code modulation is used. One example of such a communication system is the reverse link transmission system of a cellular CDMA system such as that described in the IS-95 system specification entitled "Mobile Station-Base Station Compatibility Standard For Dual-Mode Wideband Spread Spectrum Cellular System," which is incorporated herein by reference.

In operation, discriminator 130 determines a current frequency error between the carrier center frequency of a received signal and the correlator/demodulator loop, which typically contains an FHT. This determination (a frequency error signal 132 (ê)) is input to a loop filter 140, which accumulates current frequency error signals 132 and then generates a residual frequency offset estimate signal 142 (f̂). Residual frequency offset estimate signal 142 is input to rotator 110, which shifts subsequently received input signals 102 by a value equal to frequency offset estimate signal 142 before passing the shifted input signal 112 (f-f̂) to a Fast Hadamard transform (FHT) type correlator 120. FHT correlator 120 acts on this input to produce a correlation vector 122, which is used by discriminator 130 to complete the loop. FHT correlator 120 also includes a data output 125 which outputs received data for use in actual signal processing.

Referring again to FIG. 1, a received communication signal 102 (of offset frequency f) is first input to rotator 110. Rotator 110 shifts the frequency of the input signal 102 to compensate for variations in the center frequency of the carrier signal. The amount by which this frequency is shifted is based on the value of the frequency offset estimate signal 142, which is determined by discriminator 130 and loop filter 140, as described below. The initial value of this estimate can be selected at random, empirically for the particular system, or using other known techniques, and could be stored in a memory element. The frequency shifted input signal 112 (f-f̂) is then input to FHT correlator 120.

FHT correlator 120 performs a correlation on the frequency shifted input signal 112 and generates a set of output values forming a correlation vector 122. In performing this correlation, FHT correlator 120 takes advantage of the properties of Walsh code modulation explained herein.

In a communication system where M-ary Walsh code modulation is employed, signal information is collected into groups of N symbols (where $2^N=M$), each of which are mapped onto one of a finite number (M) of Walsh functions. For example, where 64-ary modulation is employed (M=64), signal information is collected into groups of 6 symbols each (N=6). Furthermore, each Walsh function is represented by 64 Walsh "chips," with each Walsh chip being ±1. Here each group of six symbols is use to select one corresponding Walsh function, which is transmitted in place of the data symbols.

By way of example, the following discussion will continue the assumption of a communication system employing a set of 64 Walsh functions (M=64). In such a system, each transmitted Walsh code (or function) can be indexed as $W_n$ where n=0 to 63. Thus, a received, modulated signal can be thought of as being comprised of a series of Walsh functions $W_n$, within the predefined universe of sixty-four Walsh functions, with every $W_n$ representing N symbols. It is important to note, however, that the present invention is equally operable over any size set of Walsh functions, or for other mappings of data symbols (N≠6) to Walsh functions.

Therefore, to decode a received modulated signal 102, FHT correlator 120 compares the received signal 102 modulated with a particular Walsh function (e.g., $W_n$ ) with each Walsh function in a predefined set of Walsh functions $W_k$ (where k=0 to 63) to determine which function was received (k=n). The orthogonality of Walsh functions makes this comparison directly possible because the correlation of any two different Walsh functions is equal to zero. Thus, by correlating the received signal (Walsh function) with the entire predefined set of Walsh functions $W_k$, the demodulator can predict which Walsh function $W_n$ was received (e.g., where the correlation between the received function and the nth predefined function is non-zero; k=n).

The fast Hadamard transform (FHT) correlator 120 of frequency tracking loop 101 performs this correlation. Referring again to FIG. 1, the rotated input signal 112 is input to FHT correlator 120. FHT correlator 120 takes the complex received signal 112 and performs a matrix multiplication on it. In the exemplary system employing a set of 64 Walsh functions, FHT correlator 120 contains a 64-by-64 matrix (not shown) which represents the predefined universe of Walsh functions. FHT correlator 120 takes the rotated input signal 112 and correlates (multiplies) it with each 64 bit vector in the matrix. This process can be thought of as Walsh decoding, as understood in the art.

The result of this correlation is a 64-by-1 vector which represents the correlation of the rotated input signal 112 with each vector in the matrix. Ideally, there are zero values in the vector which each represent a situation where the input vector 112 is orthogonal to the matrix vector. Then, each non-zero value in the vector represents a likelihood that the associated input vector 112 and the matrix vector are non-orthogonal (e.g., that the associated input vector is that particular $W_k$). However, in the presence of signal noise or interference, as well as when there is an error in the frequency tracking, there are non-zero values in the correlation vector even when the input and matrix vectors are orthogonal. In addition, the ideally non-zero outputs may have less energy than some other outputs generated because of noise. This makes the process of detecting of the correct Walsh function $W_n$ being received very difficult at best with current techniques.

FHT 120 may accomplish the correlation processing in any of several ways. In addition to matrix multiplication as described above, FHT 120 may be constructed using a series of criss-cross networks which perform a series of summations (add/subtract). Furthermore, FHT 120 may operate on input vector 112 serially or in parallel. The structure and operation of FHT processors of this type are known in the art such as shown and described in U.S. patent application Ser. No. 08/173,460 entitled *"Method And Apparatus For Performing A Fast Hadamard Transform,"* or U.S. patent application Ser. No. 08/424,773 entitled *"Method And Apparatus For Unified Signal Modulation,"* each of which is assigned to the assignee of the present application and is incorporated herein by reference.

Figure 2:
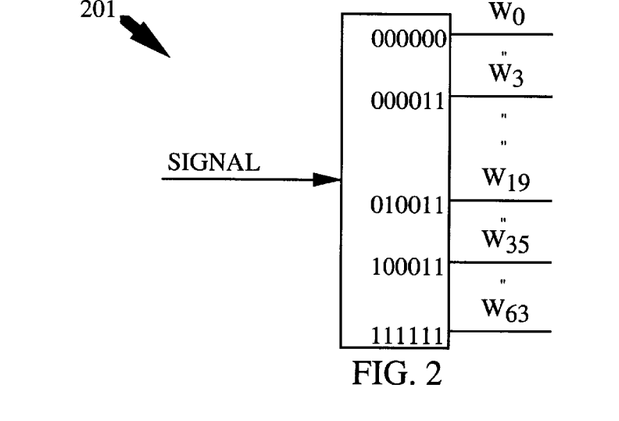
FIG. 2 depicts a diagram of an FHT element with associated output values and corresponding indexes useful for implementing the tracking loop of FIG. 1.

In addition to the 64-by-1 vector, FHT correlator 120 also determines or assigns the Walsh index associated with the value of each correlation that was performed. Generally, the index value is known or assumed from the ordering of the outputs in a predetermined fashion, such as the ascending order 0–63 pattern of FIG. 2. However, separate indices could be generated and transferred with corresponding output values where these are transferred in serial fashion to other processing circuitry using the indices. In either case, this index is a binary representation of the Walsh function matrix entry which was correlated with the input signal. For example, in the exemplary system employing 64 Walsh functions, a 6-bit index value is associated with each correlation output (e.g., 000000 through 111111 representing Walsh functions $W_0$ through $W_{63}$ respectively). This is depicted in FIG. 2, where the corresponding correlation values are assigned to correlator 120 outputs in a linear ascending order from 0 through 63. The indices or corresponding index values are show in FIG. 2 next to each output. However, correlator 120 or FHT device 201 can be constructed to present the correlation outputs in other orders or patterns, such as even and odd, as long as the absolute index value of k is known.

Upon completion of Walsh demodulation for any received signal, FHT correlator 120 outputs a correlation vector 122. This correlation vector includes the 64-by-1 vector representing the correlation that was performed with each of the set of Walsh functions, and has associated Walsh function indices that correspond to each correlation result. FHT 120 also includes a data output 125 which outputs correlated received signal data or Walsh function data for further signal processing to produce transmitted data symbols.

As with any demodulation process, however, the Walsh correlation process is affected by any variation or drift in the carrier frequency of the received signal (or local oscillator). This is because any such variation affects the orthogonality of the received Walsh functions by impacting spectral alignment of the received chip values (±1) with the correlated sequences. In the Walsh decoding process described above, the presence of a frequency error between the carrier center frequency and the Walsh decoding; frequency has two effects: (1) the amount of energy present in the Walsh function that was actually transmitted (k=n) is reduced; and (2) energy also begins to appear in Walsh functions that were not actually transmitted (k≠n). This latter effect is exacerbated by the presence of noise energy being added to some outputs. Frequency tracking loop 101 employs a discriminator 130 to overcome these difficulties.

Discriminator 130 receives the correlation vector 122 from FHT correlator 120 and generates a frequency error signal 132 which is input to loop filter 140. Discriminator 130 accomplishes this by taking advantage of certain unique properties associated with Walsh functions as used in communication systems.

A. Properties of Walsh Functions

As stated above, Walsh functions as used in communication systems possess certain unique properties. One such property pertains to the relationship between the energy present in the correlation output for the Walsh function that was actually transmitted (the "correct" function) and all other outputs for correlated Walsh functions in the predefined universe of functions. This property is described in detail below.

As stated above, when Walsh functions are used in a communication system, a predefined set of Walsh functions is used to modulate a data signal, or a predefined sub-set of a known set. In the exemplary system employing 64 Walsh functions, this universe of Walsh functions can be represented by $W_k$ where k=0 to 63. Thus, in binary representation, the Walsh function index k can be represented by a 6-digit value (e.g., k=000000 to k=111111).

When a data signal is modulated using a particular Walsh function or series of such functions $W_n$, the Walsh function index 'n' associated with each Walsh function used is known. Further, the binary representation of this Walsh function index is also easily determined (e.g., where n=19, the binary representation =010011). In the present invention, the index values are generated with or assumed for corresponding correlator 120 output values, as described herein.

Importantly, where Walsh function modulation is employed, a unique relationship exists between the index of the Walsh function actually used to modulate the data signal, and all other Walsh functions in the predefined universe of functions. This relationship derives from the relationship between the energy present in each Walsh function correlation, and the frequency error between the carrier center frequency and the frequency tracking loop/correlator.

The first case that must be considered is when there is no residual frequency error. When there is no residual frequency error and a signal is Walsh demodulated (correlated), signal energy will be present only in the Walsh function actually transmitted (e.g., in a noiseless signal). In the present invention this is represented by the presence of signal energy in only one of the FHT correlator 120 correlation outputs (e.g., the one corresponding to the transmitted Walsh symbol). All other FHT correlator outputs would contain only noise. Although, in an actual communication system, the noise energy may appear larger at the correlator outputs than signal energy.

In contrast, when there is a residual frequency error, the transmitted signal will appear to "leak" into the outputs associated with other decoded Walsh functions. In the present invention, this would appear as a reduction of energy in the FHT correlator 120 output representing the Walsh function that was actually transmitted, and an increase in signal energy in the correlation outputs corresponding to other Walsh functions. The amount of this leakage is proportional to the frequency error.

Therefore, when the nth Walsh function is received with a frequency error of $f_{error}$ and a phase error of $\phi_0$, the signal component of the $k^{th}$ output of the complex FHT output, denoted as $R_k$, is given by the relationship of Equation 1 below. In Equation 1, $E_{user}$ represents the power of input signal 102, $T_w$ is the Walsh chip duration, $W_k[i]$ is the $i^{th}$ chip of the $k^{th}$ Walsh function, m=k⊕n where ⊕ denotes the bitwise exclusive-OR operator, and $\Im(W_m)$ denotes the Fourier transform of the $m^{th}$ Walsh function.

$$R_k = \sqrt{E_{user}} \cdot e^{j\phi_0} \cdot \sum_{i=0}^{M-1} W_n[i] W_k[i] \cdot (e^{j2\pi f_{error} T_w i}) \quad (1)$$

$$= \sqrt{E_{user}} \cdot e^{j\phi_0} \cdot \sum_{i=0}^{M-1} W_m[i] \cdot (e^{j2\pi f_{error} T_w i})$$

$$= \sqrt{E_{user}} \cdot e^{j\phi_0} \cdot \Im(W_m)_{w=2\pi f_{error} T_w}$$

The relationship expressed in Equation 1, in turn, relies on the property of Walsh functions illustrated by Equation 2.

$$W_n[i] W_k[i] = W_m[i], \text{ where } m = k \oplus n \quad (2)$$

Thus, if $W_n$ is the transmitted Walsh function, then the signal component of the $k^{th}$ (e.g., noiseless) complex output of correlator 120 is the Fourier transform of the $m^{th}$ Walsh function where $m = k \oplus n$. This implies that the $n^{th}$ FHT output is the Fourier transform of the zeroth Walsh function (i.e., all 1's).

The correlator 120 outputs having energy from low frequency error in tracking a signal are those related in index value by powers of two. Therefore, they have the property that for low frequency errors, the imaginary part of the product of the correlator output for the Walsh function with the highest energy value and the complex conjugate of the correlator output for a Walsh function with a lower energy value is proportional to the frequency error of the tracking loop. The correlator output for the Walsh function with the highest energy represents the Fourier transform of Walsh function zero ($W_0$). This is shown generally by Equation 3, where Im indicates that only the imaginary part of the complex number is taken, $\Im(W_0)_W$ is the Fourier transform of $W_0$, and $\overline{\Im(W_{2k})_W}$ is the complex conjugate of the Fourier transform of Walsh function $2^k$.

$$Im(\Im(W_0)_\omega \overline{\Im(W_{2k})_\omega}) \omega \quad (3)$$

The complex correlator 120 output with the greatest signal energy, therefore, represents the correlator output with the greatest likelihood of corresponding to the Walsh function that was actually transmitted when used to modulate the data signal. As stated above, the correlator 120 correlation vector contains value components associated with certain Walsh function indexes. These paired sets of values are used by discriminator 130 to determine the current frequency error, and ultimately the residual frequency error, as described in detail below.

B. Discriminator Operation

Discriminator 130 receives a correlation vector 122 from correlator 120 for each rotated input signal 112 that is demodulated. As described above in detail, this vector 122 contains a collection of complex numbers paired or associated with corresponding Walsh indexes. Generally, these complex numbers are ordered according to the predefined Walsh indexes. In this case, identification of the corresponding Walsh index is implicitly provided. Discriminator 130 uses the vector 122 values and corresponding indices as inputs to determine the current frequency error 132 between the carrier center frequency and the rotator. This determination involves a several step process.

First, discriminator 130 determines which correlator 120 (FHT) output has the greatest signal energy component. As explained above, this output represents the greatest likelihood that a particular Walsh function was transmitted. Discriminator 130 associates a binary representation of the Walsh index that corresponds to that Walsh function. As explained above, this value was determined by the structure and operation of correlator 120 (either generated or assumed) and is reflected in the arrangement of correlation vector 122 (via predefined ordering of the FHT output values). For example, assume that the correlator 120 output with the greatest signal energy corresponds to the $36^{th}$ Walsh function in a predefined set of 64 Walsh functions. The Walsh index n would then be 35 ($W_{35}$; starting at $W_0$), and the binary representation of this index would be "100011."

Finally, discriminator 130 calculates the current error 132 of the demodulator loop by relying on a unique property of Walsh modulation. As explained earlier, the correlation vector 122 output from correlator 120 contains complex numbers having corresponding Walsh indexes for each decoded Walsh symbol. Further, the decoded correlator output with the maximum signal energy corresponds generally to the output containing the largest signal component of the Walsh function that was actually transmitted. Importantly, when the most significant bit (MSB) of the binary representation of the Walsh index for this output is inverted, the resulting Walsh index represents the correlator output which has the second largest component of the decoded signal.

Continuing the previous example, assume that the correlator output for the Walsh function with index k=35 has the greatest energy upon Walsh decoding. In this case, the binary index value is "100011." Therefore, the correlator output that represents the second largest transmitted signal component occurs for k="000011," or a Walsh function index of 3, the MSB having been inverted.

This relationship continues as lower order bits are inverted. Therefore, the correlator output with the third largest transmitted signal component corresponds with the Walsh function associated with binary Walsh index value 110011 or decimal 51 (k=51). Similarly, the correlator output with the fourth largest transmitted signal component corresponds with the binary Walsh function index value 101011 or decimal 43 (k=43). This unique relationship, together with the general properties of Walsh functions shown by Equation 3, permits discriminator 130 to determine the current value of frequency error 132.

In one embodiment, discriminator 130 determines the current error by using the correlator output with the highest signal energy, assumed most likely transmitted Walsh function, and taking the imaginary part of the product between this output and the complex conjugate of the correlator output corresponding to the Walsh index determined by inverting the MSB of the highest energy Walsh index. This process can be seen from the relationship shown by Equation 4.

$$\hat{e} = Im\left(X(i) \sum_{k=0}^{L} \overline{X(i \oplus 2^k)}\right) \quad (4)$$

Thus, in one embodiment, the properties shown by Equations 1 and 3 are used to derive a discriminator that forms an estimate of frequency error as shown in Equation 4. In Equation 4, $X(n)$ is the complex FHT output corresponding to Walsh index n, i is the Walsh index for the correlator output with the largest output energy, $\bar{x}$ denotes the complex conjugate of x, and $\oplus$ is the bitwise exclusive OR operator (e.g., $i \oplus 2^k$ is the index obtained by inverting the $k^{th}$ least significant bit in the binary representation of i), and L is the number of terms in the discriminator (e.g., a number between 1 and 6 for 64-function Walsh modulation).

While Equation 4 represents one method of estimating the current error of the demodulator loop, it is important to understand that many other estimation techniques are possible, each based on the unique properties of Walsh modulation disclosed above. Examples of these will be considered below. First, however, the operation of loop filter 140 and rotator 110 is discussed.

Loop filter 140 is essentially an accumulator/integrator, included to stabilize the response of frequency tracking loop 101. In operation, the current error output 132 of discriminator 130 may appear quite noisy. Therefore, loop filter 140 may employ any number of conventional techniques to dampen the response of frequency tracking loop 101. Various techniques that may be used will be apparent to one skilled in the art, and will therefore not be considered further.

Similarly, rotator 110 is essentially a frequency shifter. Rotator 110 shifts the frequency of any input signal 102 by a value equal to the frequency estimate 142 input to rotator 110. As with loop filter 140, rotator 110 may be of any number of conventionally available designs known to one skilled in the art.

Figure 3:
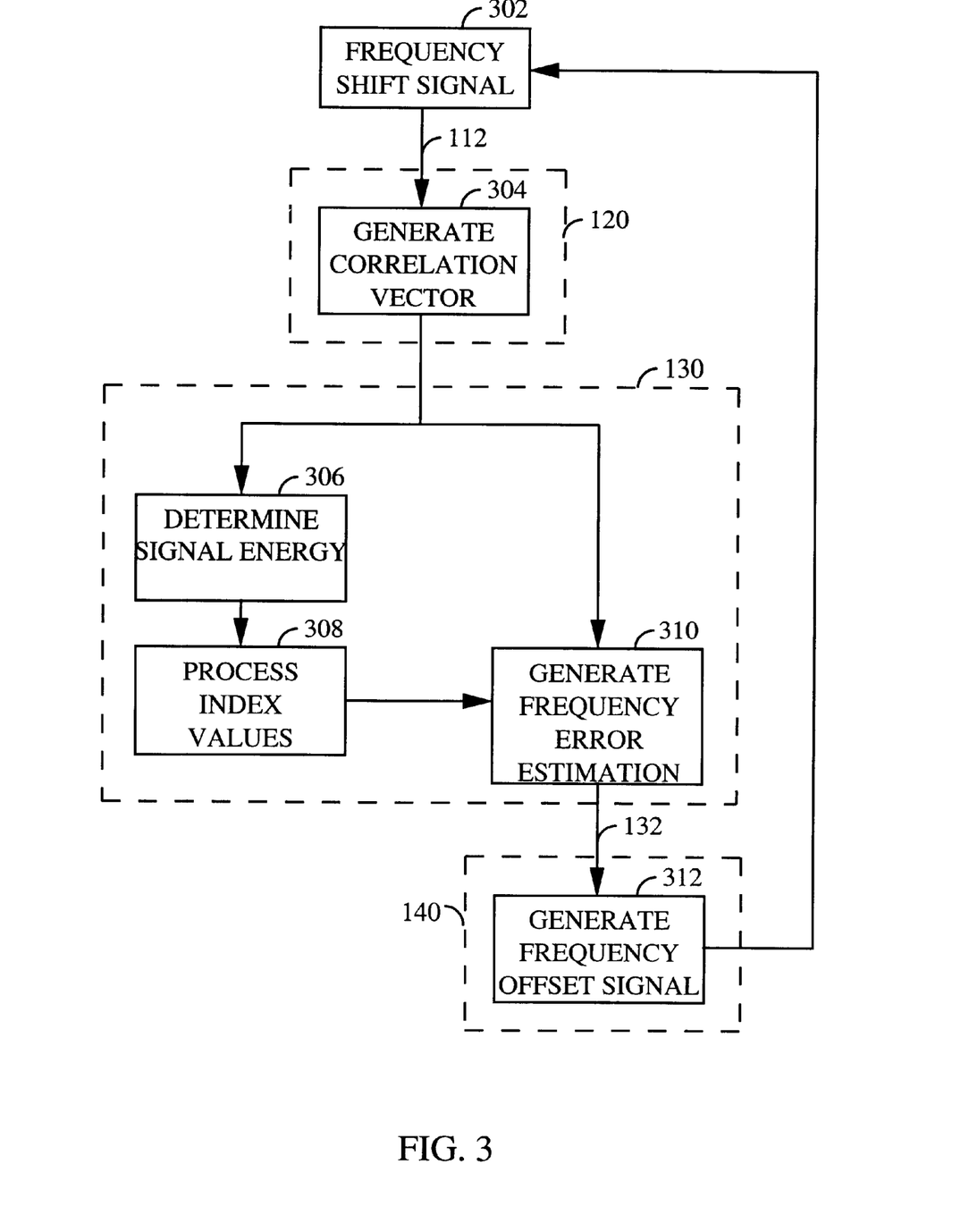
FIG. 3 is a flow chart showing processing performed by the present invention.

The method used by frequency tracking loop 101 to determine the current error is also illustrated generally by FIG. 3. Referring to FIG. 3, a frequency shifted signal 112 is generated in a step 302, by rotator 110, and input to FHT correlator 120. A correlation vector generator portion of FHT correlator 120 generates a correlation vector 122 in a step 304 which is input to discriminator 130. As explained in detail above, discriminator 130 then determines the signal energy in a step 306 corresponding to the highest energy correlator output. The index of this output is used to form or generate one or more additional Walsh function indices in a step 308, that are related to the highest energy correlator output index by powers of two. Indices are formed in step 308 by inverting one or more bits of the binary representation of the highest energy index. These indices are used to estimate the frequency error in a step 310, to produce frequency error signal 132 (ê). The indices indicate the output values (vector components) to be used to generate the error estimate from the correlator output (vector). That is, the outputs to use in computing cross products. The Walsh index values used by discriminator 130 may be obtained employing various processing techniques, as disclosed herein.

As discussed earlier, the estimate of the frequency error from step 310 is the referred to as the "current error" for the tracking loop. The frequency error estimate can subsequently be used in a step 312 by filter 140 to form frequency offset estimate signal 142 (f̂) which is known as the "residual error". Frequency offset estimate signal 142 is then used to adjust the shifting or rotation for input signals by rotator 110.

The filtering means accumulates the resulting frequency error signals to produce the frequency offset estimate used by the rotator means ("residual error").

Importantly, FIG. 3 represents only one possible arrangement of the functional portions of the method used to determine the current error. Alternative arrangements will be apparent to one skilled in the art.

C. Additional Estimating Techniques

As stated above, discriminator 130 may employ various techniques to determine the current error of frequency tracking loop 101. In addition to the techniques employed in the embodiment described above, many other techniques are possible. The choice of which technique to employ is generally guided by the performance characteristics of the frequency tracking loop that are desired. In this regard, the performance of a frequency tracking loop is generally expressed in terms of either (or both) of two characteristics: (1) the steady-state performance of the loop; and (2) the pull-in range of the loop.

The steady-state performance of a frequency tracking loop is defined as the standard deviation of the steady-state error of the loop. Thus, as the carrier frequency drifts, the steady-state performance factor indicates how well the loop tracks these drifts (assuming the loop had previously locked onto the carrier frequency).

The pull-in range of a frequency tracking loop is defined as the range of frequencies over which the loop can differ initially from the carrier frequency and still thereafter settle in on the carrier frequency. Thus, a loop with a relatively wide pull-in range can accommodate greater differences between loop and carrier frequency.

By varying the technique that is used by discriminator 130 to estimate the current error 132, the steady-state performance and/or pull-in range of the frequency tracking loop 101 can be varied as desired. For example, when discriminator 130 determines the current error 132 using only the Walsh index obtained by inverting the most significant bit (MSB) of the estimated correct Walsh index, the frequency tracking loop 101 generally has the best steady-state performance. In this case, however, frequency tracking loop 101 also has the smallest pull-in range.

In contrast, when discriminator 130 determines the current error using only the Walsh index obtained by inverting the least significant bit (LSB) of the correct Walsh index, the pull-in range of frequency tracking loop 101 is increased. In this case, however, the steady-state performance is not as good.

Alternatively, discriminator 130 can invert various mid-order bits (e.g., MSB-1, MSB-2, etc.) to achieve intermediate performance characteristics. Still further, discriminator 130 can employ various averaging schemes to estimate the current error. For example, discriminator 130 can determine the current error using an average of the estimates obtained by inverting more than one bit of the correct Walsh index. Based on the disclosure contained herein, combinations in addition to those described above will be readily apparent to one skilled in the art.

D. Conclusion

After reading the above description, it will become apparent to a person skilled in the relevant art how to implement the invention using other alternative embodiments. Therefore, while various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What we claim is:

1. A frequency tracking loop for a communication system that uses orthogonal M-ary Walsh modulation to generate communication signals, the loop comprising:

rotation means for receiving an input signal and a frequency offset estimate and for producing a frequency shifted input signal, with the amount of frequency shift being controlled by the frequency offset estimate;

correlation means for determining a correlation between a predetermined set of Walsh functions and the frequency shifted input signal and for producing a correlation vector;

discrimination means for receiving said correlation vector and for producing a frequency error signal proportional to a difference between said tracking loop and communication signal frequencies, wherein said discrimination means comprises:

means for finding a first correlation result having a greatest energy value;

means for determining a binary representation of a corresponding first index value for the first correlation result; and means for inverting at least one bit of said binary representation of said first index value to generate a second index value corresponding to a second correlation result; and filtering means for accumulating said frequency error signal, and for producing said frequency offset estimate.

2. The frequency tracking loop of claim 1, wherein said correlation means comprises means for producing a correlation vector having a plurality of correlation results, each being the result of a correlation between the frequency shifted input signal and one Walsh function from the predetermined set of Walsh functions, each correlation result having an index value corresponding to a particular one of said Walsh functions in the set which may be represented in binary notation.

3. The frequency tracking loop of claim 1, wherein said discriminator means further comprises:

means for producing a complex conjugate of said second correlation result designated by said second index value;

means for generating a product of said complex conjugate of said second correlation result and said first correlation result; and means for selecting the imaginary part of said product as a frequency error signal.

4. The frequency tracking loop of claim 1, wherein said one bit being inverted is the Most Significant Bit (MSB) of the binary representation.

5. The frequency tracking loop of claim 1, wherein said one bit being inverted is a less significant bit of said first binary representation.

6. The frequency tracking loop of claim 1, wherein said one bit being inverted is the Least Significant Bit (LSB) of the binary representation.

7. The frequency tracking loop of claim 1, wherein said discrimination means further comprises means for inverting at least a second bit of said binary representation of said first index value to generate a third index value corresponding to a third correlation result.

8. The frequency tracking loop of claim 7, wherein said discriminator means further comprises:

means for producing a first complex conjugate of said second correlation result designated by said second index value;

means for generating a first product of said first complex conjugate of said second correlation result and said first correlation result;

means for producing a second complex conjugate of said third correlation result designated by said third index value;

means for generating a second product of said second complex conjugate of said third correlation result and said first correlation result; and means for selecting the imaginary part of an average of said first and second products as a frequency error signal.

9. The frequency tracking loop of claim 1, wherein said predetermined set of Walsh functions comprises 64 Walsh functions having a length of 64 chips.

10. The frequency tracking loop of claim 1, wherein said filtering means comprises a second order filter.

11. A frequency tracking loop for a communication system that uses orthogonal M-ary Walsh modulation to generate communication signals, the loop comprising:

rotation means for receiving an input signal and a frequency offset estimate and for producing a frequency shifted input signal, with the amount of frequency shift being controlled by the frequency offset estimate;

correlation means for determining a correlation between a predetermined set of Walsh functions and the frequency shifted input signal and for producing a correlation vector;

discrimination means for receiving said correlation vector and for producing a frequency error signal proportional to a difference between said tracking loop and communication signal frequencies, wherein said discrimination means comprises:

means for finding a first correlation result having a greatest energy value;

means for determining a binary representation of a corresponding first index value for the first correlation result;

means for inverting one or more individual bits of said binary representation of said first index value to generate one or more additional index values corresponding to additional correlation results;

means for producing a complex conjugate of each of said correlation results designated by said additional index values;

means for generating products of each resulting complex conjugate of said additional correlation results and said first correlation result;

means for selecting the imaginary part of an average of resulting products as a frequency error signal; and filtering means for accumulating said frequency error signal, and for producing said frequency offset estimate.

12. The frequency tracking loop of claim 11, wherein a MSB and a less significant bit of said first binary representation are each inverted to provide said additional index values.

13. The frequency tracking loop of claim 11, wherein said less significant bit of said first binary representation is a LSB.

14. The frequency tracking loop of claim 11, wherein two or more less significant bits of the binary representation are each inverted to provide said additional index values.

15. A frequency tracking loop for a communication system that uses orthogonal M-ary Walsh modulation to generate communication signals, the loop comprising:

at least one rotator connected to receive an input signal and a frequency offset estimate, and to produce a frequency shifted input signal, with the amount of frequency shift being controlled by the frequency offset estimate;

at least one correlator connected to receive said frequency shifted input signal and generate a correlation vector by correlating said shifted input signal with a predetermined set of Walsh functions;

at least one discriminator connected to receive said correlation vector and produce a frequency error signal proportional to a difference between said tracking loop and communication signal frequencies, said discriminator comprising:

means for finding a first correlation result having a greatest energy value;

means for determining a binary representation of a corresponding first index value for the first correlation result; and means for inverting one or more individual bits of said binary representation of said first index value to generate one or more additional index values corresponding to additional correlation results; and at least one filter connected to receive and accumulate said frequency error signal, so as to produce said frequency offset estimate.

16. A discriminator for use in a frequency tracking loop for use in a communication system that uses M-ary orthogonal Walsh modulation with a predetermined set of Walsh functions, comprising:

input means for receiving a correlation vector having a plurality of complex numbers and corresponding Walsh indexes;

amplitude detection means for determining a first complex number having a greatest absolute value in said plurality of complex numbers;

inversion means for inverting at least one bit of a first binary representation of a Walsh index corresponding to said first complex number to generate at least a second binary representation corresponding to a second complex number in said plurality of complex numbers; and estimating means for calculating a frequency error based on a relationship between said first complex number and said at least second complex number.

17. The discriminator of claim 16, wherein said at least one bit being inverted is the Most Significant Bit (MSB) of the binary representation.

18. The discriminator of claim 16, wherein at least one bit being inverted is a less significant bit of said first binary representation, wherein the bit index is designated by the relationship MSB-n, where n is a value from 1 to the number of bits in said first binary representation.

19. The discriminator of claim 16, wherein said estimating means further comprises means for averaging at least two frequency errors.

20. A method for determining the residual error in a frequency tracking loop used in a communication system employing M-ary orthogonal Walsh modulation, the method comprising the steps of:

generating a correlation vector having a plurality of correlation results and corresponding index values represented in binary notation;

determining which of said plurality of correlation results has a greatest signal energy;

inverting a bit of a first index value corresponding to said correlation result to generate a second index value; and estimating a frequency error based on a relationship between said correlation result corresponding to said first index value and a correlation result corresponding to said second index value.

21. A method of tracking a frequency of communication signals in a communication system that uses M-ary orthogonal Walsh modulation to generate the communication signals, using a frequency tracking loop, and the steps comprising:

receiving an input signal and a frequency offset estimate and producing a frequency shifted input signal, with the amount of frequency shift being controlled by the frequency offset estimate;

determining a correlation between a predetermined set of Walsh functions and the frequency shifted input signal and producing a correlation vector;

receiving said correlation vector and producing a frequency error signal proportional to a difference between said tracking loop and communication signal frequencies by:

finding a first correlation result having a greatest energy value;

determining a binary representation of a corresponding first index value for the first correlation result; and inverting at least one bit of said binary representation of said first index value to generate one or more additional index values corresponding to additional correlation results; and accumulating said frequency error signal and producing said frequency offset estimate.

22. The method of claim 21, wherein said step of producing a correlation vector comprises producing an array of a plurality of correlation results, each being the result of a correlation between the frequency shifted input signal and one Walsh function from the predetermined set of Walsh functions, each correlation result having an index value corresponding to a particular one of said Walsh functions in the set which may be represented in binary notation.

23. The method of claim 21, wherein said step of producing a frequency error further comprises the steps of:

producing a complex conjugate of each of said additional correlation results designated by said additional index values;

generating a product of said complex conjugate of said additional correlation results and said first correlation result; and selecting the imaginary part of at least one of said products as a frequency error signal.

24. The method of claim 23, wherein said selecting step further comprises the steps of selecting and averaging the imaginary parts of more than one of said products to provide a frequency error signal.

25. The method of claim 23, wherein said selecting step further comprises the steps of selecting and accumulating the imaginary parts of more than one of said products to provide a frequency error signal.

26. The method of claim 21, wherein the Most Significant Bit (MSB) of the binary representation is inverted.

27. The method of claim 21, wherein at least one less significant bit of said first binary representation is inverted.

28. The method of claim 27, wherein said less significant bit is the Least Significant Bit (LSB) of the binary representation.

29. The method of claim 21, wherein said step of producing a frequency error further comprises the step of inverting at least a second bit of said binary representation of said first index value to generate a third index value corresponding to a third correlation result.

30. The method of claim 29, further comprising the steps of:

producing a first complex conjugate of said second correlation result designated by said second index value;

generating a first product of said first complex conjugate of said second correlation result and said first correlation result;

producing a second complex conjugate of said third correlation result designated by said third index value;

generating a second product of said second complex conjugate of said third correlation result and said first correlation result; and selecting the imaginary part of an average of said first and second products as a frequency error signal.

31. The method of claim 30, wherein said one bit being inverted is the MSB of the binary representation, and said second bit being inverted is a less significant bit of said first binary representation.

32. The method of claim 30, wherein said one bit being inverted and said second bit being inverted are both less significant bits of the binary representation.

33. The method of claim 21, wherein said predetermined set of Walsh functions comprises 64 Walsh functions each having a length of 64 chips.

34. The method of claim 21, wherein said step of filtering comprises using a second order filter.

* * * * *